United States Patent [19]

Garnett

[11] 4,328,723
[45] May 11, 1982

[54] ADJUSTABLE TOOL COMPENSATING ARM

[75] Inventor: Donald W. Garnett, Grand Ledge, Mich.

[73] Assignee: The Olofsson Corporation, Lansing, Mich.

[21] Appl. No.: 174,996

[22] Filed: Aug. 4, 1980

[51] Int. Cl.³ .............................................. B23B 29/00
[52] U.S. Cl. .................................................... 82/36 R
[58] Field of Search ........................................ 82/36 R

[56] References Cited
U.S. PATENT DOCUMENTS

| | | | |
|---|---|---|---|
| 2,988,943 | 6/1961 | Trible | 82/36 R |
| 3,051,029 | 8/1962 | Cashman et al. | 82/36 R |
| 3,190,152 | 6/1965 | Werth | 82/36 R |
| 3,232,153 | 2/1966 | Davis | 82/36 R |
| 3,283,626 | 11/1966 | Alvey et al. | 82/36 R |
| 3,296,904 | 1/1967 | Bullard | 82/36 R |

Primary Examiner—Harrison L. Hinson
Attorney, Agent, or Firm—Whittemore, Hulbert & Belknap

[57] ABSTRACT

An elongated relatively rigid yet resilient tool compensating bar formed from rectangular bar stock with strategically placed slots to form three basic body members, namely a stationary body member, a lower body member, and an upper body member. The stationary body member is adapted to be secured in fixed position to a suitable support. The lower body member has side portions along opposite sides of the base member, being separated from the base member by a pair of slots and integrally connected to the base member by a flexure web or neck of the bar between said slots adjacent one end of the bar. This flexure web enables the lower body member to flex laterally relative to the stationary member. The upper body member is disposed over the stationary and lower body members and is separated therefrom by a third slot. Additional slots at opposite ends of the bar form flexure webs integrally connecting the upper body member to the lower body member and enabling the upper body member to flex relative to the lower body member in a direction lengthwise of the bar.

16 Claims, 4 Drawing Figures

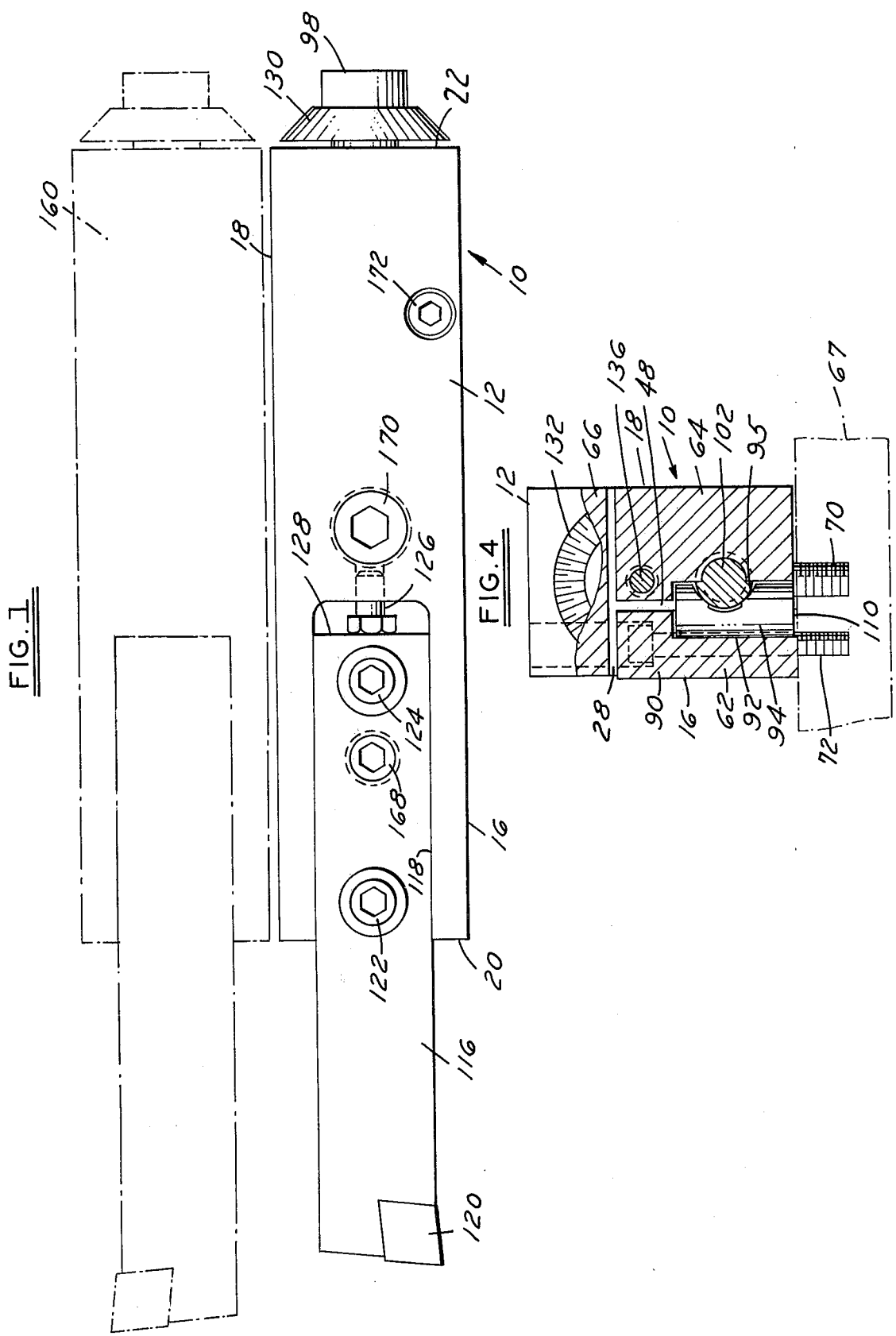

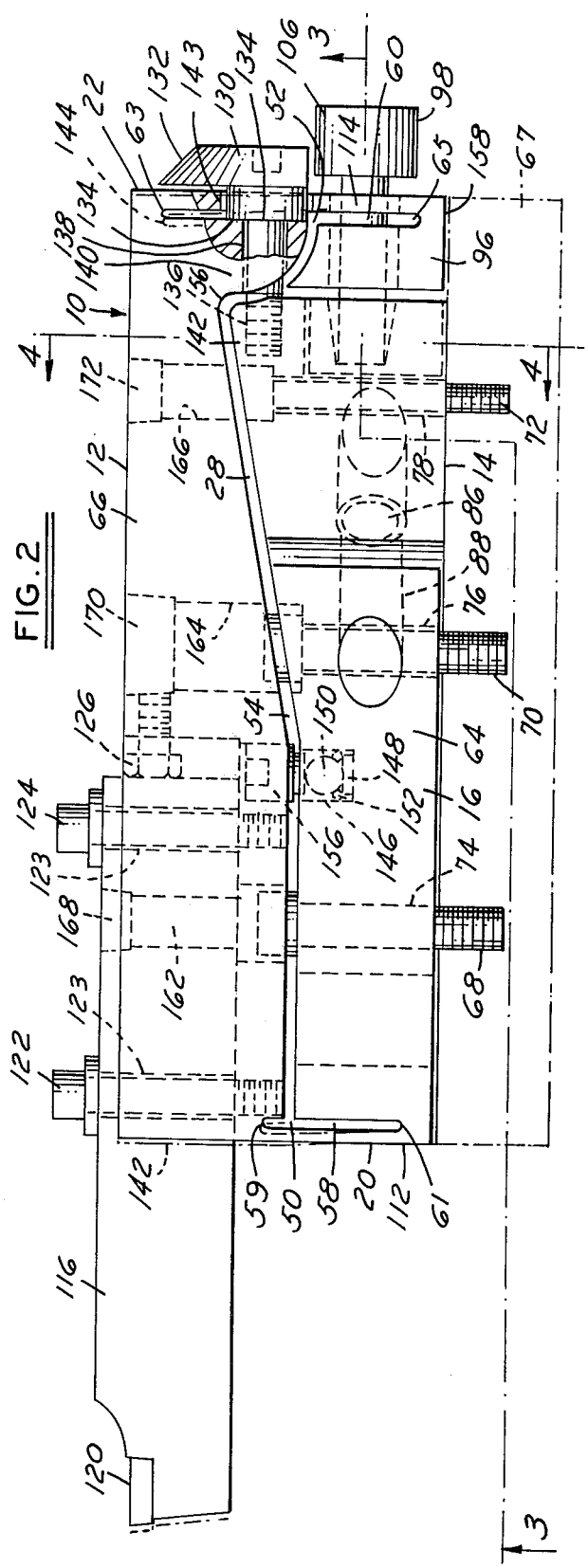
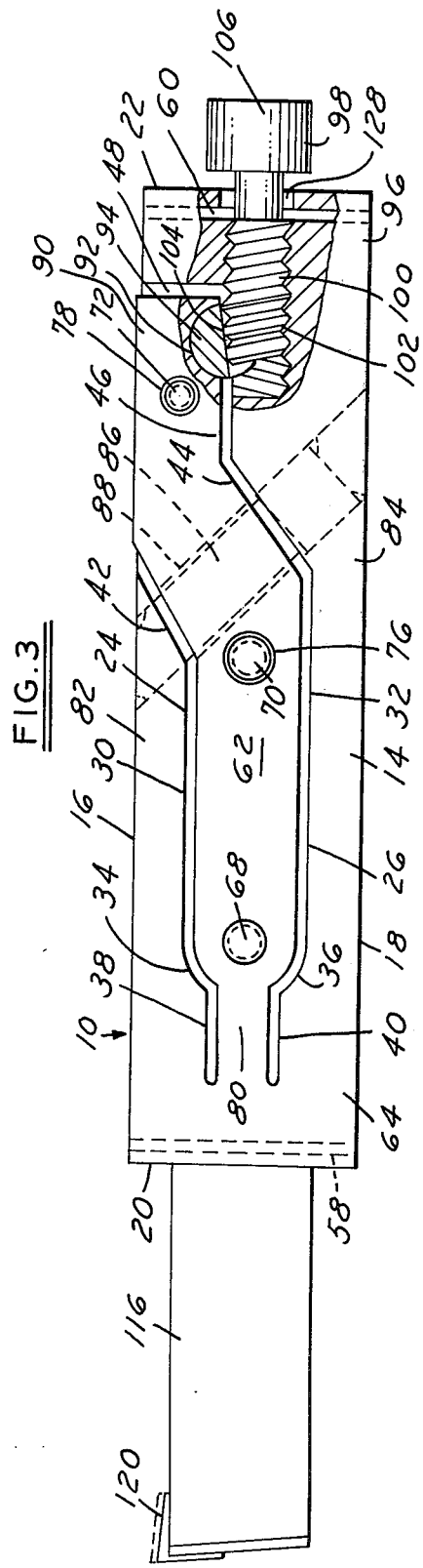

ADJUSTABLE TOOL COMPENSATING ARM

This invention relates generally to tool compensating bars and refers more particularly to a tool compensating bar which is adjustable both radially and axially.

SUMMARY OF THE INVENTION

The tool compensating bar of this invention is adapted to support a tool bit in operative position relative to a workpiece to be bored, turned or otherwise machined. It is a primary object to provide a tool compensating bar which is capable of precise adjustment in both the radial (diameter) and axial (depth) directions.

Other objects are to provide a tool compensating bar with:

1. Precise adjustment in both radial and axial directions.
2. Rigidity for making heavy roughing cuts and intermittent cuts as well as finishing cuts.
3. Ability to make depth adjustment without affecting the diameter setting.
4. Large total adjustment range.
5. Convenient, easy adjustment.
6. Ruggedness to withstand the tool environment of rough usage, coolant and chips.
7. Compact design, especially in the width direction to allow high density tooling. 8. All adjustment backlash preloaded out for repeatability.
9. Reduced or eliminated slip stick (stiction) which is the tendency of a movable part to stick until its inertia is overcome.
10. Ability for rough positioning of tool on tool plate with all tooling in place.
11. Adjustments having a reasonably low torque requirement.
12. Relatively low manufacturing costs. To this end, the tool bar is made from a single piece of bar stock with strategically placed slots to provide the desired flexure motions within a small package.
13. Endurance capability of thousands of complete range of adjustments.

These and other objects of the invention will become more apparent as the description proceeds, especially when considered with the accompanying drawings.

BRIEF DESCRIPTION OF THE DRAWINGS

FIG. 1 is a top plan view of a tool compensating bar constructed in accordance with my invention, with a second tool compensating bar shown alongside in phantom lines.

FIG. 2 is a side elevational view of the tool compensating bar shown in FIG. 1, with parts in section.

FIG. 3 is a bottom plan view with parts in section, as seen on the line 3—3 in FIG. 2.

FIG. 4 is a sectional view taken on the line 4—4 in FIG. 2.

Referring now more particularly to the drawings, the numeral 10 generally designates an elongated tool compensating bar of unitary, one-piece construction which is formed from rectangular bar stock and made of a suitable spring steel or other rigid and resilient material. The bar will usually be mounted horizontally (although not necessarily) so that its top and bottom or base surfaces 12 and 14 are horizontal. The bar also has parallel sides 16 and 18, and parallel ends 20 and 22. The sides and ends in the specific embodiment shown are perpendicular to the top and bottom surfaces.

The bar is formed with strategically placed slots to provide three basic body members interconnected by flexure webs as will now be described.

The bar 10 has vertical slots 24 and 26 which are cut up from the bottom 14 and extend generally lengthwise of the bar. There is also a slot 28 which is cut through the bar from one side to the other and likewise extends generally lengthwise of the bar. The upper edges of slots 24 and 26 terminates or merge into the slot 28.

The slots 24 and 26 have laterally spaced portions 30 and 32 which are parallel to the longitudinal center line of the bar and respectively spaced equal distances from the adjacent sides of the bar. At their front ends, the slot portions 30 and 32 are curved inwardly toward one another where indicated at 34 and 36 and terminate in portions 38 and 40 which are parallel to the longitudinal center line of the bar. The terminal slot portions 38 and 40 are more closely spaced than the slot portions 30 and 32 and are respectively spaced equal distances from the adjacent sides of the bar.

Extending from the rear ends of the slot portions 30 and 32 are the spaced, parallel slot portions 42 and 44 which are disposed at an acute angle to the longitudinal center line of the bar. Slot portion 42 projects through the side 16 of the bar. Slot portion 44 connects into the slot portion 46 which is parallel to the longitudinal center line of the bar. Slot portion 46 connects into transverse slot portion 48 which is disposed at right angles to the longitudinal center line of the bar and projects through the side thereof.

The slot 28 from the front end 50 to the rear end 52 thereof is perpendicular to a vertical plane through the longitudinal center line of the bar. From its front end 50 to the point 54 it is horizontal. From point 54 to point 56 it is inclined upwardly and rearwardly. From point 56 to its rear end 52, it extends in a downward and rearward arc.

A vertical slot 58 near the front end of the bar has its upper end 59 slightly above the slot 28 and terminates at its lower end 61 near the bottom of the bar. The slot 58 extends through the bar from one side to the other and is perpendicular to the longitudinal center line of the bar. It cuts across and intersects the front end of slot 28.

A vertical slot 60 near the rear end of the bar extends from its upper end 63 near the top of the bar down to its lower end 65 near the bottom of the bar. Slot 60 extends through the bar from one side to the other and is perpendicular to the longitudinal center line of the bar. It cuts across or intersects the rear end 52 of the slot 28.

The three basic body members referred to above which are formed by the slotting are the stationary body or base member 62, the lower body member 64, and the upper body member 66.

The stationary body member 62 is an elongated member which extends generally lengthwise of the bar 10, having the dog-leg configuration best seen in FIG. 3. The body member 62 is bolted down to the machine base or slide 67 of a boring-turning machine (shown in phantom lines in FIG. 2), for example, by bolts 68, 70 and 72 so that the bottom surface of the tool bar is fixedly engaged with and secured to the top supporting surface of the slide 67. The hole 74 in the body member 62 through which the bolt 68 extends closely receives the shank of the bolt, but the holes 76 and 78 in the body member 62 through which bolts 70 and 72 extend are larger clearance holes to permit a coarse adjustment in the position of the body member 62 by rotation thereof on the bolt 68. The widespread position of the bolts 68, 70 and 72 along the length of the body member 62 provides a secure friction attachment of the body member 62 to the machine slide 67 to resist all cutting forces.

The lower body member 64 of the tool bar 10 is integrally connected to the stationary body member 62 by a thick or heavy flexure neck or web 80 between the terminal portions 38 and 40 of the slots 24 and 26. This lower body member 64 has the two elongated side portions 82 and 84 which partially embrace the stationary body member 62, being separated therefrom by the two slots 24 and 26. The ends of the side portions 82 and 84 of the lower body member 64 remote from the front end 20 of the bar are connected together by a cross tie 86 which extends through a clearance hole 88 in the stationary body member 62. The ends of the cross tie are secured by any suitable means to the side portions 82 and 84, as by welding in sockets formed in the side portions. The cross tie adds rigidity to the rear end portion of the lower body member 64.

The rear end portion 90 of the stationary body member 62 is formed with a vertically extending semicylindrical recess 92 which is open at the bottom. A generally cylindrical rocker member 94 is rotatably fitted in recess 92. The rocker member 94 has an arcuate seat 95 in one side wall thereof the axis of which is perpendicular to the longitudinal center line of the rocker.

The rear end 96 of the lower body member 64 has an axial passage threadedly receiving an axially extending lateral or radial adjustment screw 98. The end of the threaded shank 100 of the screw is conically ground where indicated at 102, partially cutting away the crest of the threads to a conically shaped nose frustum. As assembled, the conical crests of the thread on the screw end 102 engage the arcuate seat 95 of the rocker 94 along line 104. The remaining flanks of the thread of screw 98 engage the internal threads of the rear end portion 96 of the lower body member 64.

When the lateral adjustment screw 98 is rotated by means of its enlarged calibrated head 106, it advances axially, and the engagement of the conical end 102 with the rocker creates a wedge-spreading force to move the rear end 96 of the lower body member 64 away from the rear end 90 of the stationary body member 62. Since the lower body member 64 has a high section modulus, flexing takes place in flexure neck 80 in a radial or lateral direction and the lower body member 64 rotates about the flexure neck.

In practice, the screw 98 is advanced to preload the rocker member 94 into recess 92 in the rear end 90 of the stationary body member 62 with sufficient force to exceed all tool cutting forces. Additional advancement of the screw 98 will then cause additional rotation of the lower body member 64 to provide adjustment of the tool bar in a radial or lateral direction.

The rocker member 94 can adjust itself rotationally within the recess 92 to allow rotation of the rear end 96 of the lower body member 64 while maintaining full contact of the screw threads along the line 104 of the seat 95 in the rocker.

It will be noted that there is clearance where indicated at 108 and 110 at both ends of the rocker member (see FIG. 4), allowing the arcuate seat 95 to self-align on the conical screw end.

The upper body member 66 of the tool bar 10 is integrally connected to the lower body member 64 by flexure webs 112 and 114. The upper body member 66 and its tool holding bar 116 are thereby constrained to rotate or move laterally with the lower body member 64 in its lateral adjustment mode described above.

The upper body member 66 has an elongated slot 118 in its upper surface 12 which extends lengthwise thereof and is open at the front end to receive the tool holding bar 116. The tool holding bar 116 is equipped with any suitable tool cutting bit 120. Bolts 122 and 124 extend through enlarged clearance holes 123 in the tool holding bar 116 and thread into the upper body member 66 to secure the tool holding bar firmly in the slot. An axially extending bolt 126 threaded into the upper body member 66 projects into the closed end of the slot 118 and its head bears against the rear 128 of the tool holding bar 116. A depth or axial adjustment of the tool holding bar 116 is permitted by the enlarged holes 123 therein through which the bolts 122 and 124 extend, and the head of the bolt 126 provides an adjustable locating surface.

An enlarged clearance opening 128 is provided through the flexure web 114 to accommodate the lateral adjustment screw 98.

A depth adjustment screw 130 has a calibrated head 132 and a thrust shoulder 134 under the head. The screw 130 extends in an axial direction at the rear of the bar 10 and its shank 136 extends through a clearance hole 138 in a downward extension 140 of the upper body member 66. The end of the shank 136 of the depth adjustment screw 130 threadedly engages with an upward extension 142 of the lower body member 62. Rotation of the depth adjustment screw 130 causes its thrust shoulder 134 to displace the upper body member 66 forward by flexing the flexure webs 112 and 114 in the direction indicated in dotted lines at 142 and 144. There is an enlarged clearance hole 143 in flexure web 114 accommodating screw 130.

In practice, the depth adjustment screw 130 is advanced to preload the thrust shoulder 134 with sufficient force to exceed all cutting tool forces. Additional advancement of the depth adjustment screw 130 will provide adjustability of the tool bar in the depth or axial direction.

Since flexure webs 112 and 114 are parallel, depth adjustment is constrained in a path that has virtually no effect on the radial or lateral adjustment.

The lower body member 64 has a cylindrical recess 146 in its upper surface. A hardened disc 148 is received in the bottom of the recess. A steel ball 150 rests on disc 148 and is moderately constrained to a center position in the recess by an O-ring 152 of neoprene, rubber or the like.

The upper body member 66 has a threaded hole extending from the bottom of slot 118 down through its under surface which threadedly receives a hard faced set screw 156. The set screw is torqued to thrust upon ball 150. As a result, the upper body member 66 is given a center support along its length between the flexure webs 112 and 114, thus increasing its rigidity. Also, as a result, the rear end 96 of the lower body member 64 is raised slightly away from the machine base or slide 67 in a vertical direction, and the resultant clearance 158 between the lower body member 66 and the machine slide removes a frictional component which might otherwise inhibit the adjustment of the lower body member.

It will be understood that bolts 68, 70 and 72 are accessible with all tooling in place, through hole 162 in tool holding bar 116 and holes 164 and 166 in the upper body member 66, thus obviating the necessity of removing tooling to adjust (a tedious process of trial and error) to find the desirable tool clamp position. Access plugs 168, 170 and 172 are removably applied over holes 162, 164 and 166.

Both the depth adjustment screw 130 and the screw 98 are calibrated and both are located close together at the rear of the tool bar in a visible and accessible position.

The narrow design of the tool compensating bar allows it to be mounted with other similar tool compensating bars in close proximity to each other, as illustrated by phantom lines at 160 in FIG. 1. Also as illustrated in phantom lines in FIG. 1, the tool bit may be located in other positions than that shown for tool bit 120.

While the tool bar of the present invention is shown as being manually operated, it will be understood that both diameter adjustment and depth adjustments may be accomplished by motor drives to the respective screws 98 and 130.

I claim:

1. In apparatus of the character described, a relatively rigid yet resilient tool compensating bar of unitary one-piece construction, said bar having first slot means defining a first member adapted to be secured in fixed position on a suitable support, a second member separated from said first member by said first slot means, flexure web means integrally connecting said second member to said first member to permit said second member to flex in a first direction relative to said first member, second slot means defining a third member and separating the same from said first and second members, and flexure web means integrally connecting said third member to said second member to permit said third member to flex in a second direction relative to said second member, said third member being adapted to carry a tool bit.

2. Apparatus as defined in claim 1, having means for flexing said second member as foresaid relative to said first member.

3. Apparatus as defined in claim 1, having means for flexing said third member as foresaid relative to said second member.

4. Apparatus as defined in claim 1, having first means for flexing said second member as aforesaid relative to said first member and second means for flexing said third member as foresaid relative to said second member.

5. Apparatus as defined in claim 4, wherein said first and second flexing means each include a screw, said screws being positioned close together in a readily accessible location.

6. Apparatus as defined in claim 1, wherein said first and second directions of flexing are at substantially right angles to one another.

7. Apparatus of the character described, comprising an elongated relatively rigid yet resilient tool compensating bar of unitary one-piece construction, said bar having a pair of elongated laterally spaced slots cut through the base of said bar and extending from points near one end of said bar toward the opposite end of said bar generally lengthwise thereof, said bar having a base member between said slots which is adapted to be secured in fixed position to a suitable support, said bar also having a second member having side portions along opposite sides of said base member and separated from said base member by said pair of slots and integrally connected to said base member by a flexure web of said bar between said slots adjacent said one end of said bar, said flexure web enabling said second member to flex laterally relatively to said base member, said bar also having a third slot cut from side to side of said bar and transverse to and intersecting said pair of slots and extending over said base and second members generally lengthwise of said bar between points adjacent opposite ends of said bar, said bar having a third member disposed over said base and second members and separated therefrom by said third slot, said bar also having fourth and fifth slots respectively adjacent opposite ends of said bar cut from side to side of said bar and transverse to and intersecting said third slot to define second and third flexure webs between said respective fourth and fifth slots and the ends of said bar integrally connecting said second and third members and enabling said third member to flex relative to said second member in a direction lengthwise of said bar, said third member being adopted to carry a tool bit.

8. Apparatus as defined in claim 7, wherein said pair of slots terminate at points remote from said one end of said bar by cutting through one side of said bar.

9. Apparatus as defined in claim 7, wherein said side portions of said second member are connected together by a tie extending through a clearance opening in said base member to increase the rigidity of said second member.

10. Apparatus as defined in claim 7, having wedge means at said opposite end of said bar for flexing said second member laterally relative to said base member.

11. Apparatus as defined in claim 10, wherein said wedge means comprises a screw threaded in one of said base and second members at said opposite end of said bar having a conical tip, and cooperating means on the other of said base and second members adapted to be engaged by said conical tip.

12. Apparatus as defined in claim 11, wherein said cooperating means comprises a rocker member fitted rotatably in said other of said base and second members and having a seat adapted to be engaged by said conical tip.

13. Apparatus as defined in claim 12, having means at said opposite end of said bar for flexing said third member relative to said second member in a direction lengthwise of said bar.

14. Apparatus as defined in claim 13, wherein said means for flexing said third member comprises a second screw alongside said first mentioned screw at said opposite end of said bar, both said screws being positioned close together in a readily accessible location.

15. Apparatus as defined in claim 14, including thrust bearing means supporting said third member on said second member between said second and third flexure webs to increase the rigidity of said third member.

16. Apparatus as defined in claim 14, wherein said bar is of a compact relatively narrow design to allow high density tooling.

* * * * *